United States Patent
Kawahara

(10) Patent No.: US 7,714,891 B2
(45) Date of Patent: May 11, 2010

(54) IMAGING APPARATUS

(75) Inventor: Norihiro Kawahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 11/203,745

(22) Filed: Aug. 15, 2005

(65) Prior Publication Data
US 2006/0044405 A1 Mar. 2, 2006

(30) Foreign Application Priority Data
Aug. 24, 2004 (JP) .............................. 2004-244242

(51) Int. Cl.
H04N 5/228 (2006.01)
H04N 11/20 (2006.01)
G03B 17/00 (2006.01)
(52) U.S. Cl. .................. 348/208.99; 348/446; 348/448; 348/451; 348/452; 396/52
(58) Field of Classification Search ............ 348/208.99, 348/208.4, 446, 448, 451, 452; 396/52
See application file for complete search history.

(56) References Cited

U.S. PATENT DOCUMENTS

| 5,832,101 | A * | 11/1998 | Hwang et al. ................ 382/107 |
| 6,493,008 | B1 * | 12/2002 | Yui ............................. 715/840 |
| 6,931,062 | B2 * | 8/2005 | Zhong .................... 375/240.12 |
| 2002/0171759 | A1 * | 11/2002 | Handjojo et al. ............ 348/452 |
| 2004/0105029 | A1 * | 6/2004 | Law et al. ................... 348/448 |
| 2004/0212732 | A1 * | 10/2004 | Matsuzaki et al. .......... 348/452 |
| 2005/0001929 | A1 * | 1/2005 | Ochial et al. ............... 348/448 |
| 2005/0094030 | A1 * | 5/2005 | Brelay ........................ 348/441 |
| 2005/0180654 | A1 * | 8/2005 | Zhu ........................... 382/269 |
| 2005/0264692 | A1 * | 12/2005 | Hoshino et al. ............. 348/452 |

FOREIGN PATENT DOCUMENTS

| JP | 08-338952 A | 12/1996 |
| JP | 2000-106664 A | 4/2000 |
| JP | 2003-179886 A | 6/2003 |

OTHER PUBLICATIONS

The above references were cited in a Jun. 9, 2009 Japanese Office Action that issued in Japanese Patent Application No. 2004-244242, a copy of which is enclosed without English Translation.

* cited by examiner

Primary Examiner—David L Ometz
Assistant Examiner—Quang V Le
(74) Attorney, Agent, or Firm—Cowan, Liebowitz & Latman, P.C.

(57) ABSTRACT

An imaging apparatus includes an imaging section which captures an object to obtain a first image signal of interlace scan type, a motion vector detection section which detects a motion vector by use of the first image signal, a vibration correction section which corrects, according to the motion vector detected by the motion vector detection section, vibration of an object image included in the first image signal, and a conversion section which converts, according to the motion vector detected by the motion vector detection section, the first image signal to a second image signal of progressive scan type.

17 Claims, 8 Drawing Sheets

IMAGING APPARATUS

BACKGROUND OF THE INVENTION

1. Field of the Invention

The present invention relates to imaging apparatuses, and more particularly to an imaging apparatus having a function of converting a captured interlace signal to a progressive signal.

2. Related Background Art

Video cameras which capture an image signal have hitherto been known. According to the television systems, such as the NTSC system, an image signal is of 2:1 interlace type. Thus, generally, the video cameras also have a configuration which outputs an interlace type image signal of 60 fields per second.

Meanwhile, in recent years, television monitors capable of displaying a progressive type image signal instead of an interlace type signal has come into wide use. Thus, video cameras capable of outputting a progressive type image signal in addition to an interlace type image signal have also been put into practical use.

In video cameras of this type, when a captured 2:1 interlace type image signal is converted to a progressive type signal, interpolation data is generated according to a motion amount of image observed between fields to interpolate pixels to be positioned between lines by use of the interpolation data.

In this case, in order to generate interpolation data suitable for both a motion part and motionless part, for example, a motion coefficient is determined for each pixel; a signal based on intrafield interpolation and a signal based on interfield interpolation are mixed with each other with a ratio according to the motion coefficient to generate the interpolation data (refer to Japanese Patent Application Laid-Open No. S58-077373, for example).

In generating the interpolation data, when a vertical edge of an image is erroneously recognized as a motion part, a flicker of narrow edge is generated. To prevent this flicker, for example, there is also known a technique of recognizing as a vertical edge, a larger one from among the edges of the current field and previous field to thereby generate a stable edge signal (refer to Japanese Patent Application Laid-Open No. H07-131678, for example).

With the apparatuses disclosed in the above described patent documents, however, a difference of signal between fields or between frames is determined in order to obtain a motion coefficient for each pixel; therefore, when the level of luminance signal changes in a direction of the time axis, the change can be erroneously recognized as a motion.

SUMMARY OF THE INVENTION

An object of the present invention is to solve the above problem.

Another object of the present invention is to determine accurately the motion part of an image to implement a conversion from an interlace image signal to a progressive image signal.

To achieve these objects, according to one aspect of the present invention, an imaging apparatus of the present invention includes: imaging means for capturing an object to obtain a first image signal of interlace scan type; motion vector detection means for detecting a motion vector by use of the first image signal obtained by the imaging means; vibration correction means for correcting, according to the motion vector detected by the motion vector detection means, vibration of the object image included in the first image signal; and conversion means for converting, according to the motion vector detected by the motion vector detection means, the first image signal to a second image signal of progressive scan type.

DESCRIPTION OF THE PREFERRED EMBODIMENTS

An embodiment of the present invention will be described below with reference to the drawings.

First Embodiment

Firstly a schematic configuration of an imaging apparatus according to a first embodiment of the present invention will be described.

Figure 1:
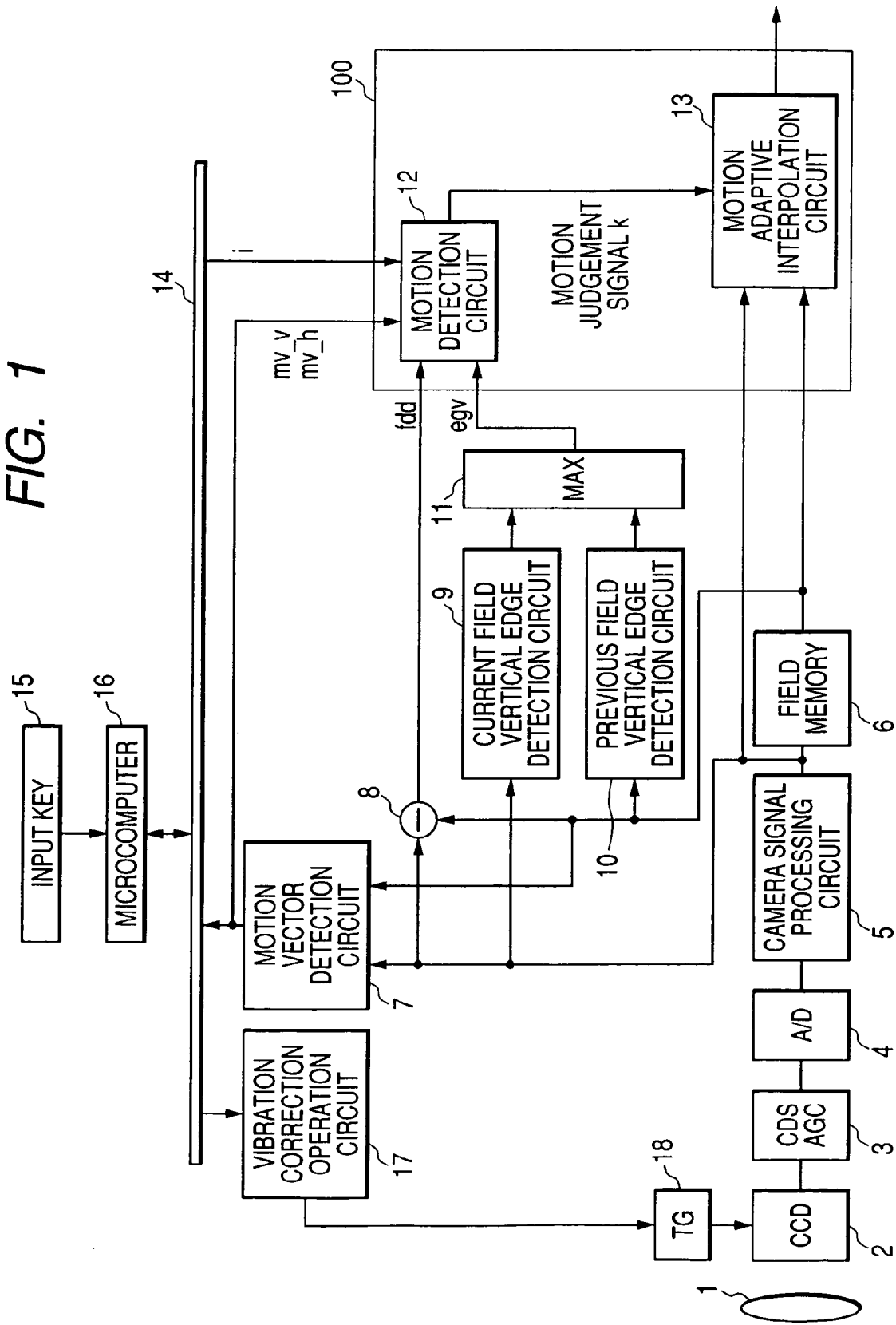
FIG. 1 is a view showing a schematic configuration of an imaging apparatus according to a first embodiment.

FIG. 1 is a block diagram showing a schematic configuration of an imaging apparatus according to a first embodiment of the present invention. In the imaging apparatus shown in FIG. 1, an instruction is inputted to a microcomputer 16 through an input key 15. Data etc. are sent from the microcomputer 16 to each constituent element via a data bus 14. An object image having passed through a lens 1 is formed on an imaging area of a charged coupled device (CCD) 2. The CCD 2, driven by a timing generator (TG) 18, performs a photoelectric conversion of a light received on the imaging area, and outputs an interlace type image signal of 30 frames per second, one frame being composed of two fields. A preprocessing circuit 3 applies processes etc., such as noise reduction (CDS) and gain control (AGC), to the image signal outputted by the CCD 2. An analog/digital (A/D) converter 4 converts an image signal outputted by the preprocessing circuit 3 from analog to digital form.

Then a camera signal processing circuit 5 applies, to the image signal converted to a digital signal, image signal processes such as aperture correction, gamma correction and white balance. The camera signal processing circuit 5 outputs each frame of an image signal with the first field first and the second field second. A field memory 6 holds the image signal outputted from the camera signal processing circuit 5 during a time period of one field, and outputs an one-field delayed signal.

A subtracter 8 calculates a difference signal fdd of an image signal between fields from the outputs of the camera signal processing circuit 5 and field memory 6. A vertical edge detection circuit 9 detects a vertical edge component in the image signal of the current field from the output of the camera signal processing circuit 5. A vertical edge detection circuit 10 detects a vertical edge component in the image signal of the previous field from the output of the field memory 6. Both of the outputs of the vertical edge detection circuits 9, and 10 are sent to a maximum value circuit 11. The maximum value circuit 11 selects a larger one from among the outputs of the vertical edge detection circuits 9 and 10, and outputs the selected one as a vertical edge signal egv.

A motion vector detection circuit 7 detects an interfield motion vector from the outputs of the camera signal processing circuit 5 and field memory 6.

Figure 8A:
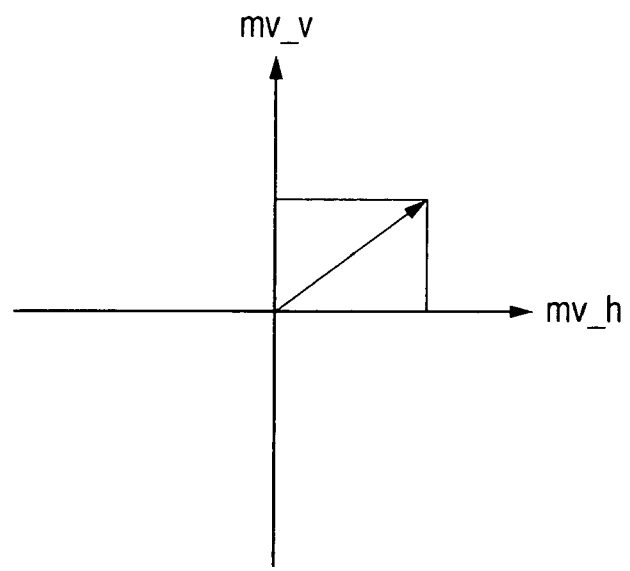
FIGS. 8A and 8B are views showing how a motion vector is detected by a motion vector detection circuit.
Figure 8B:
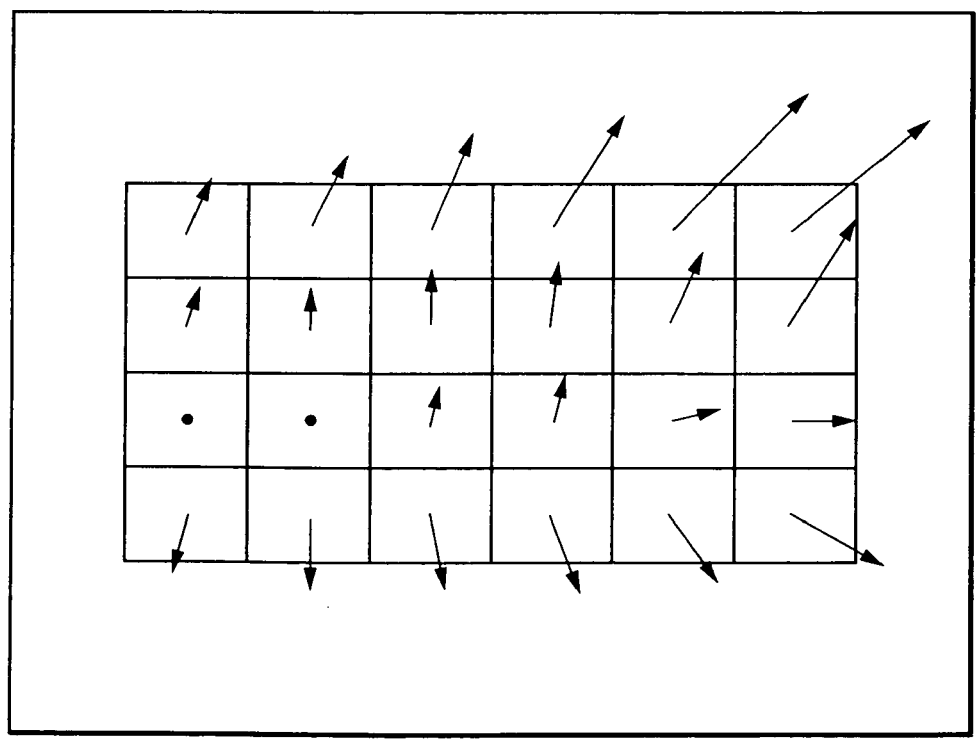

Specifically, as shown in FIG. 8B, the motion vector detection circuit 7 divides an image signal of one field into a plurality of blocks each composed of a predetermined number of pixels, and detects vertical-direction and horizontal-direction motion vectors (mv_v, mv_h) shown in FIG. 8A, for example. The values of the motion vectors (mv_v, mv_h) detected by the motion vector detection circuit 7 are sent to the microcomputer 16 via the data bus 14.

The microcomputer 16 calculates a motion vector of the entire field by use of the motion vector data of each block, and converts the calculated motion vector to a form suitable for a vibration correction operation circuit 17, and sends it to the vibration correction operation circuit 17 via the data bus 14.

The vibration correction operation circuit 17 controls the TG 18 based on the motion vector data to vary the image-reading position of the CCD2 so that the vibration of an object image is cancelled. As the vibration of an object image, for example, vibration which is caused by the movement of a user's hand holding the imaging apparatus, is known.

Figure 4:
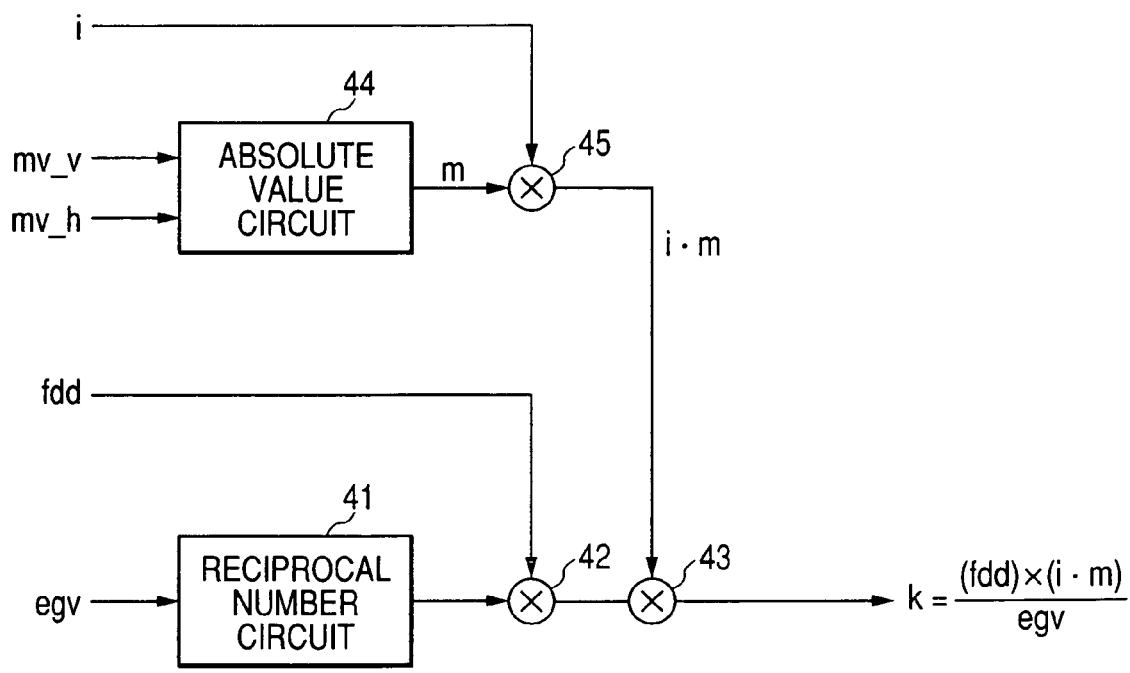
FIG. 4 is a view showing an exemplary circuit configuration of a motion detection circuit.

The interfield difference signal fdd being the output of the subtracter 8, the vertical edge signal egv being the output of the maximum value circuit 11, the vertical-direction and horizontal-direction motion vectors (mv_v, mv_h) being the output of the motion vector detection circuit 7, and a constant i generated by the microcomputer 16 are inputted to a motion detection circuit 12 within a signal type conversion circuit 100. A method of determining this constant i will be described later. The motion detection circuit 12 calculates, based on the inputted signals, a motion judgment signal k being a signal indicating the motion of an object image for each pixel. An example of the circuit configuration is shown in FIG. 4. FIG. 4 is a view showing an exemplary circuit configuration of the motion detection circuit 12 shown in FIG. 1.

As shown in FIG. 4, a reciprocal number circuit 41 receives the vertical edge signal egv being the output of the maximum value circuit 11, and outputs its reciprocal number 1/egv. The reciprocal number 1/egv outputted by the reciprocal number circuit 41 is inputted to a multiplier 42 to be multiplied by the signal fdd outputted by the subtracter 8. Accordingly, the multiplier 42 calculates fdd/egv and thereby determines which one of the edge component and interfield difference is larger.

The absolute value circuit 44 determines an absolute value m of the vertical-direction and horizontal-direction motion vectors (mv_v, mv_h) being the output of the motion vector detection circuit 7, and then normalizes the absolute value so that the value of k described below does not exceed 1, to output the absolute value. The multiplier 45 multiplies the constant i generated by the microcomputer 16 by the output m of the absolute value circuit 44. The multiplier 43 multiplies the output of the multiplier 42 by the output of the multiplier 45. The motion detection circuit 12 is a circuit which calculates the following formula 1 in accordance with the above described configuration and thereby calculates a judgment signal k.

$$k=(fdd) \times i \times m/egv \quad \text{(formula 1)}$$

Now return to the description of FIG. 1. A motion adaptive interpolation circuit 13 performs the following calculation based on the judgment signal k outputted by the motion detection circuit 12 and thereby generates interpolation data. Specifically, with respect to two fields constituting one frame, by using an average A of data of pixels above and below an interpolation pixel in the current field, and a data value B of a pixel in the same position of the previous field, $$k \times A + (1-k) \times B$$

is calculated. A value obtained from the calculation is set as interpolation data. By using this interpolation data, pixels between lines of each field in an interlace type image signal are interpolated, whereby the interlace type image signal is converted to a progressive type image signal.

Note that A is a value of intrafield interpolation data generated by using only data within the same field; B is a value of interfield interpolation data generated by using data of another field.

The judgment signal k controls a combination ratio of the value A of intrafield interpolation data and the value B of interfield interpolation data, the value A being an average value of pixels of the 10 current field which are positioned in the vicinity of the pixel to be interpolated, the value B being a value of pixel of the previous field to be interpolated. The value of k is $0 \leq k \leq 1$.

According to a conventional art, the motion judgment is performed by using only an interfield difference. Consequently, when the luminance level of an image changes, this is erroneously recognized as a motion to convert the interlace signal to a progressive signal, thus deteriorating the image quality.

In contrast, according to the present embodiment, the motion judgment is performed by using not a change in luminance level but the detection result of a motion vector for each block. Consequently, for example, even when the interfield difference fdd is large in formula 1 due to a change in luminance level, if the absolute value m of the motion vector is small, k becomes small, thus enabling prevention of the above described erroneous recognition. Meanwhile, even when the fdd is small in formula 1, if m is large, then k becomes large, thus enabling the motion part of an image to be prevented from being erroneously recognized as a motionless part.

An example of another circuit configuration different from the exemplary circuit configuration of the motion detection circuit 12 shown in FIG. 4 will now be described with reference to FIGS. 5 and 6.

Figure 5:
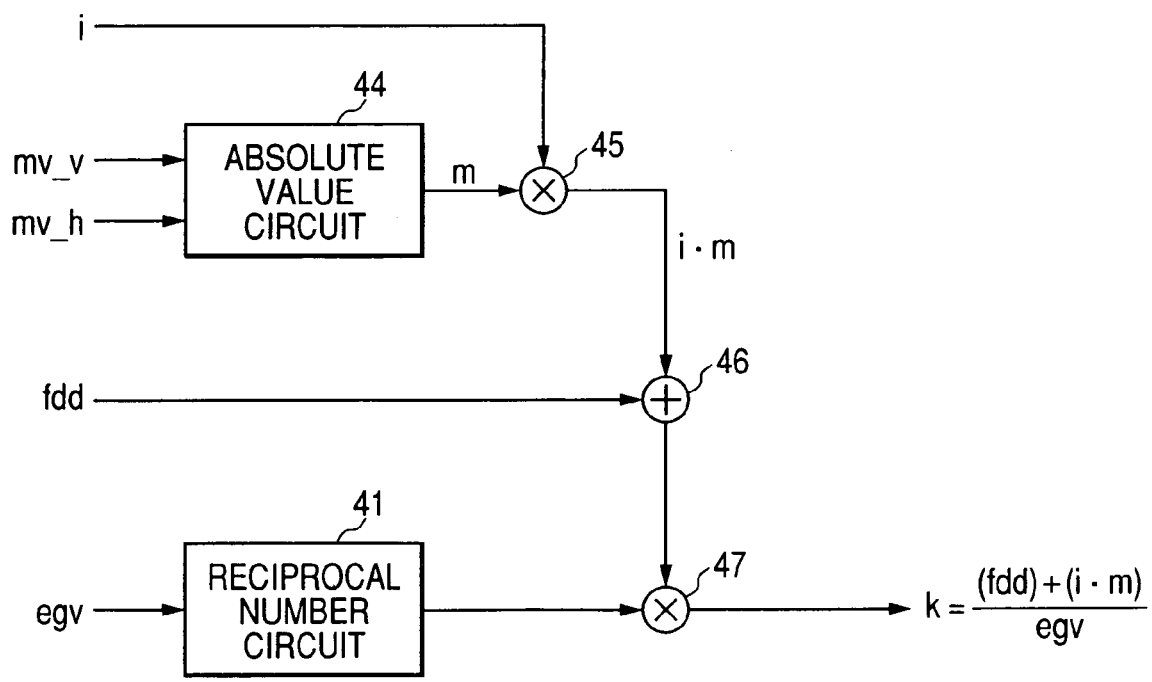
FIG. 5 is a view showing another exemplary circuit configuration of the motion detection circuit.

FIG. 5 is a view showing another exemplary circuit configuration of the motion detection circuit 12 shown in FIG. 1. FIG. 5 is different from FIG. 4 in that the output (i×m) of the multiplier 45 and the interfield difference fdd are added to each other by an adder 46, and the addition result is multiplied by the output of the reciprocal number circuit 41 by an multiplier 47. With the circuit configuration shown in FIG. 5, the following formula 2 is calculated.

$$k=((fdd)+i \times m)/egv \quad \text{(formula 2)}$$

Figure 6:
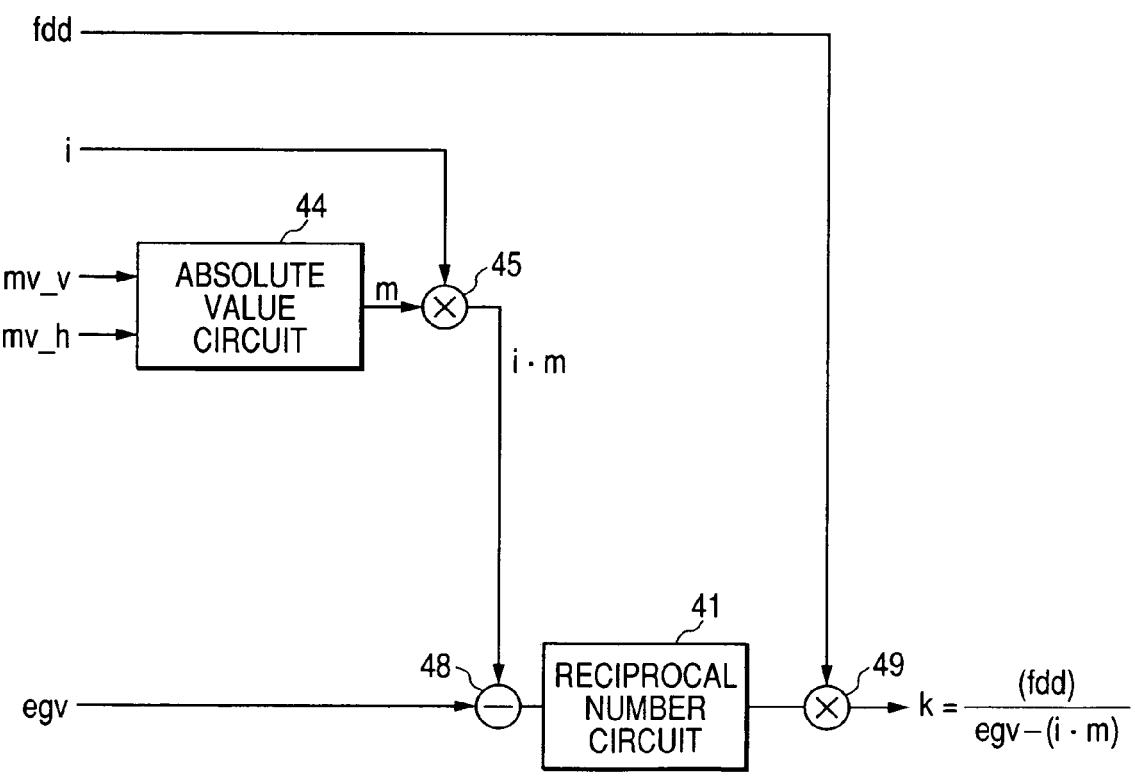
FIG. 6 is a view showing another exemplary circuit configuration of the motion detection circuit.

FIG. 6 is a view showing another exemplary circuit configuration of the motion detection circuit 12 shown in FIG. 1. FIG. 6 is different from FIG. 4 in that the output (i×m) of the multiplier 45 is subtracted from the vertical edge signal egv being the output of the maximum value circuit 11 by a subtracter 48 and then an reciprocal number 1/(egv−(i×m)) is calculated by the reciprocal number circuit 41, and also in that the reciprocal number outputted by the reciprocal number circuit 41 is multiplied by the interfield difference fdd by an multiplier 49. With the circuit configuration shown in FIG. 6, the following formula 3 is calculated.

$$k = fdd/(egv - i \times m) \quad \text{(formula 3)}$$

As described above, the exemplary circuit configuration of the motion detection circuit 12 shown in FIG. 4 is different from the exemplary circuit configurations of the motion detection circuit 12 shown in FIGS. 5 and 6. However, in both formulas 2 and 3, similarly to formula 1, even when the interfield difference fdd is large, if m is small, then k becomes small; meanwhile, even when the interfield difference fdd is small, if m is large, then k becomes large, thus enabling prevention of erroneous recognition.

Also, according to the present embodiment, the motion judgment is performed by using motion vector information from the motion vector detection circuit originally provided for the purpose of image stabilization function of the video camera. Accordingly, any constituent element needs not to be added with respect to the video camera.

According to the first embodiment, as the circuit configuration of the motion detection circuit 12 shown in FIG. 1, any one of the exemplary circuit configurations shown in FIGS. 4 to 6 can be employed. Also, in the imaging apparatus of the present embodiment, an interfield difference and interfield motion vector are calculated for the purpose of the motion judgment. The present embodiment, however, is not limited thereto; an interframe difference and motion vector may be calculated.

According to the first embodiment, the motion vector is detected by the motion vector detection circuit. However, an angle-velocity sensor can be provided instead of the motion vector detection circuit to detect the motion vector of the imaging apparatus. The image stabilization is performed by using the motion vector information from the angle-velocity sensor. And the motion judgment is performed by using the motion vector information from the angle-velocity sensor.

Second Embodiment

Figure 2:
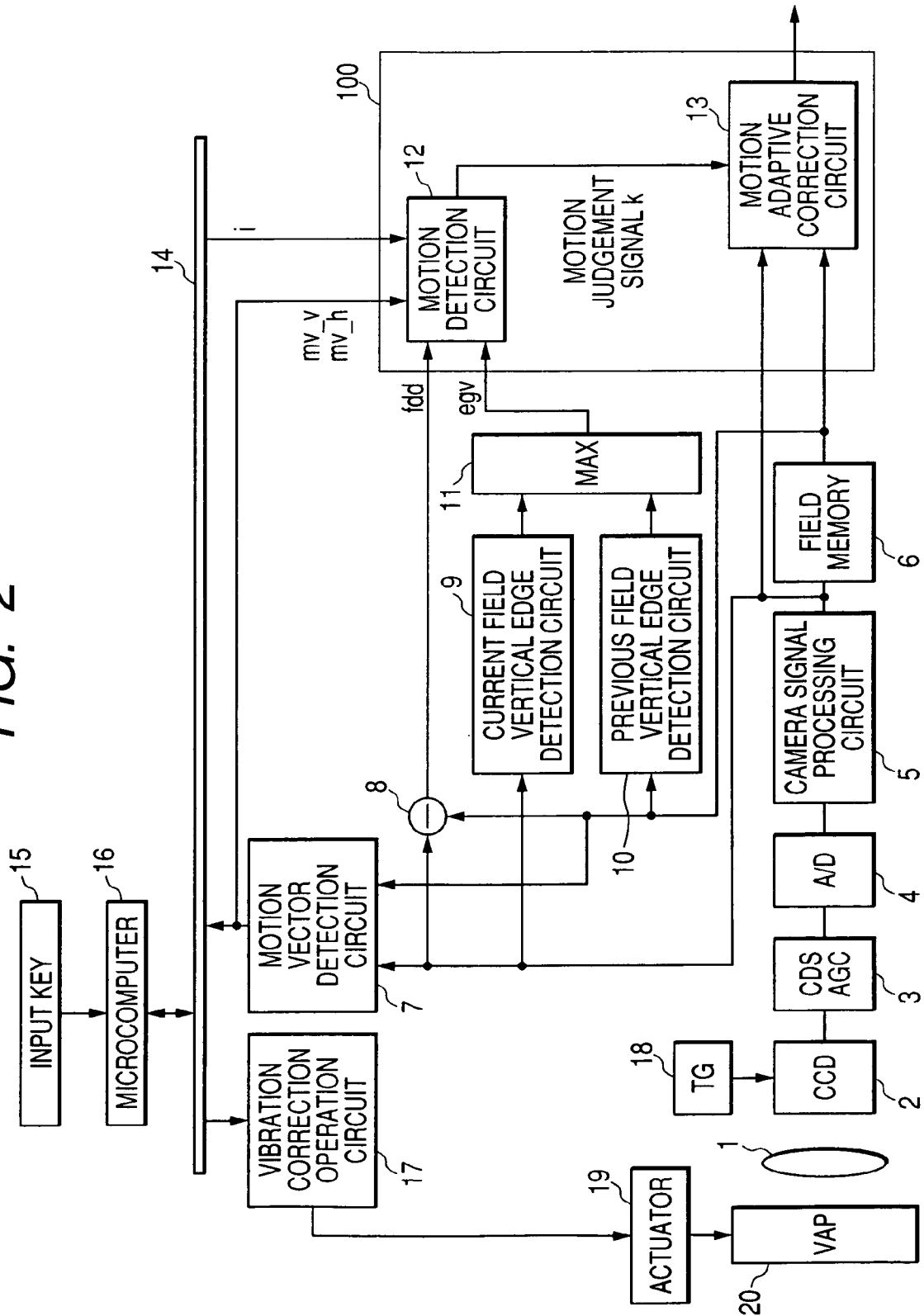
FIG. 2 is a view showing a schematic configuration of an imaging apparatus according to a second embodiment.

An imaging apparatus according to a second embodiment of the present invention will now be described. FIG. 2 is a view showing a schematic configuration of an imaging apparatus according to a second embodiment of the present invention.

In the imaging apparatus according to the second embodiment, vibration correction performed by controlling the drive of the CCD as in the first embodiment is not employed, but optical image stabilization by a variable angle prism (VAP) 20 is performed.

In this case, an actuator 19 for operating the VAP 20 is controlled by an output of a vibration correction operation circuit 17 to cancel vibration caused by hand movement. The other constituent elements of the imaging apparatus according to the second embodiment shown in FIG. 2 are similar to those of the first embodiment shown in FIG. 1, and an explanation thereof is omitted.

Third Embodiment

Figure 3:
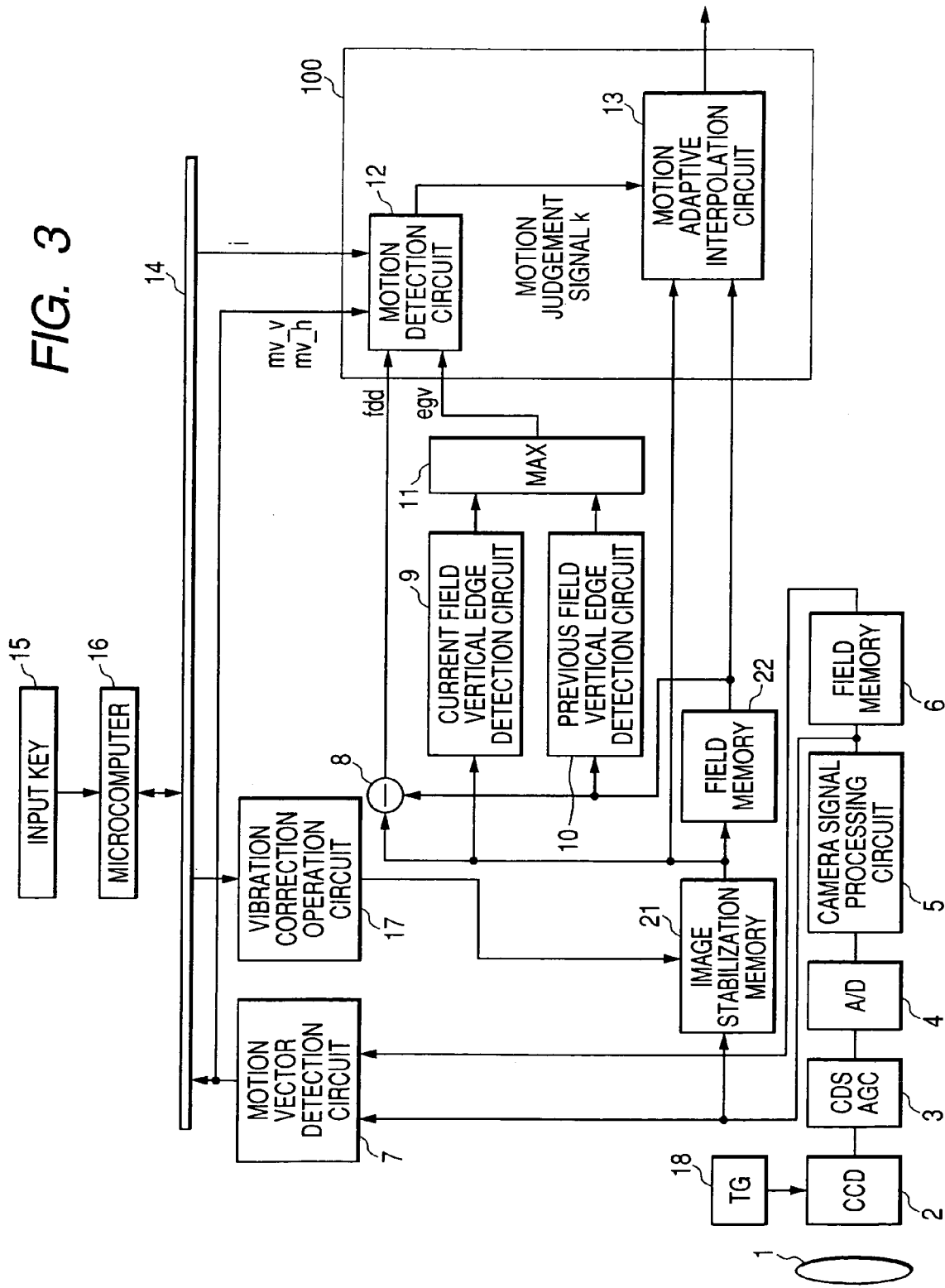
FIG. 3 is a view showing a schematic configuration of an imaging apparatus according to a third embodiment.

An imaging apparatus according to a third embodiment of the present invention will now be described. FIG. 3 is a view showing a schematic configuration of an imaging apparatus according to a third embodiment of the present invention.

The imaging apparatus according to the third embodiment is different from the first and second embodiments in that, instead of the value of a motion vector being fed back to the TG 18 or VAP 20 to achieve image stabilization, the value of a motion vector is outputted to a image stabilization memory 21 at the rear stage to implement image stabilization by feed forward control.

An image signal outputted from the camera signal processing circuit 5 is inputted to a field memory 6, motion vector detection circuit 7, and image stabilization memory 21. A vibration correction operation circuit 17 varies the position of data read out from the image stabilization memory 21 based on a calculated motion vector, thereby canceling vibration.

An output of the image stabilization memory 21 is inputted to a field memory 22 to perform motion judgment similarly to the first and second embodiments. In the output of the image stabilization memory 21, however, vibration has already been cancelled by the image stabilization operation (vibration correction process). Thus, if a motion vector were detected here, the detected motion vector should be smaller than one calculated by the motion vector detection circuit 7. Accordingly, in the third embodiment, weighting by the absolute value m of a motion vector needs not to be applied to the motion judgment as much as in the first and second embodiments. Specifically, by decreasing constant i of formulas 1 to 3 outputted by the microcomputer 16, the degree of dependence of k on m can be reduced. Note that, in a case where image stabilization operation is in the off state at this time, when a motion vector in the output of the image stabilization memory 21 is calculated, it coincides with the motion vector calculated by the motion vector detection circuit 7; therefore, constant i of formulas 1 to 3 need not to be made small.

Figure 7:
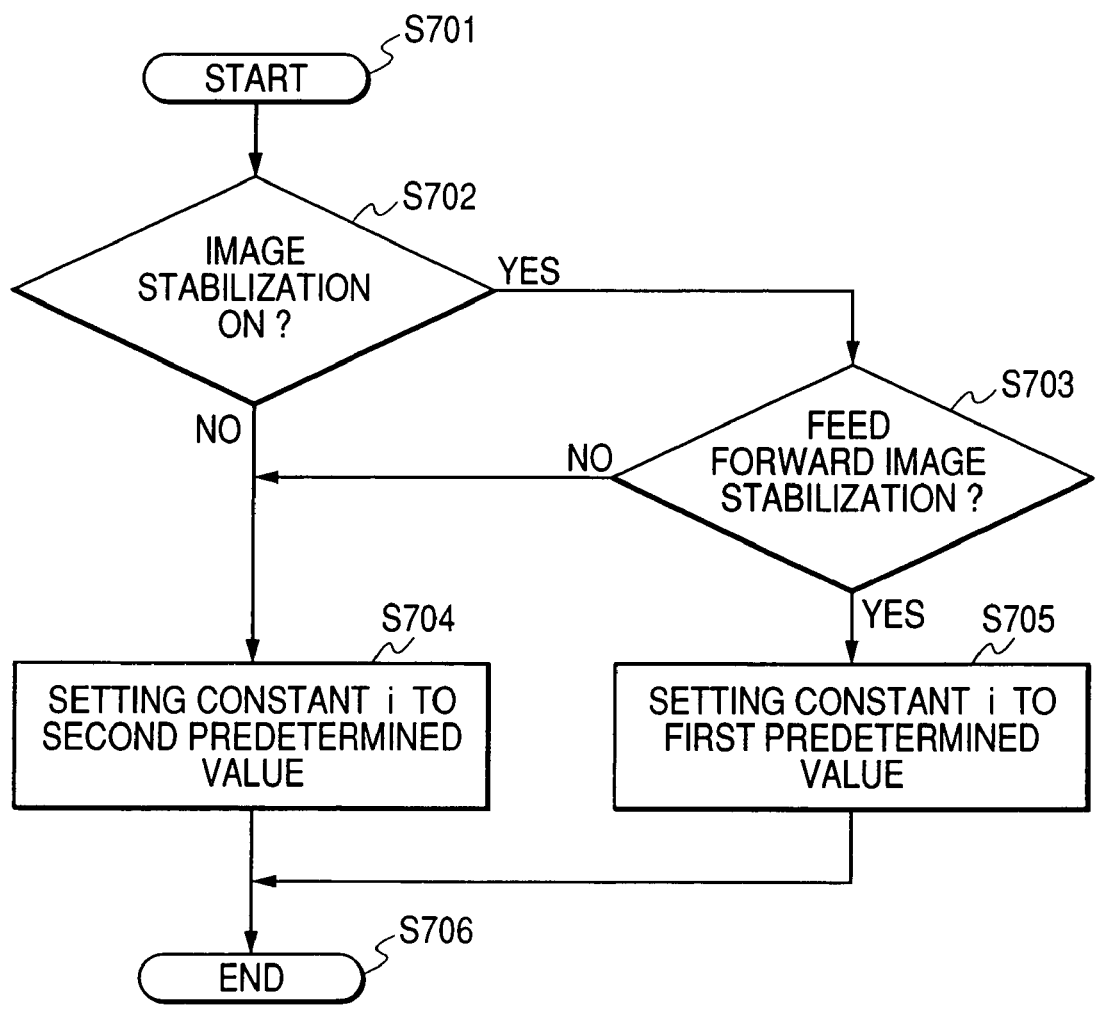
FIG. 7 is a flowchart showing a process of determining constant i.

An algorism of determining constant i used in formulas 1 to 3 applied to all the above described first to third embodiments will now be described. FIG. 7 is a flowchart showing an algorism of determining constant i used in formulas 1 to 3 applied to all the above described first to third embodiments.

As shown in FIG. 7, in step S701, the microcomputer 16 initiates a process of determining constant i. Then, in step S702, the microcomputer 16 discriminates whether image stabilization operation is in the on state or in the off state. If image stabilization operation is in the on state, the flow proceeds to step 703, and the microcomputer 16 discriminates whether image stabilization is of a feedforward method or of a feedback method. If image stabilization is of a feedforward method as in the third embodiment, the microcomputer 16 proceeds to step S705, and sets constant i to a first predetermined value, for example, about 0.5. If image stabilization is of a feedback method as in the first and second embodiments (NO in step S703), or if image stabilization operation is in the off state (NO in step S702), the microcomputer 16 sets constant i to a second predetermined value, for example, 1. When step S704 or S705 is completed, the microcomputer 16 terminates the process of determining constant i (step S706).

As described above, in the signal type conversion circuit 100, the motion detection signal k is generated based on proper constant i outputted by the microcomputer 16, and the value of a motion vector outputted by the image stabilization apparatus. Based on the generated motion judgment signal k, intrafield interpolation data and interfield interpolation data are combined, whereby interpolation data based on more correct motion judgment can be generated.

The microcomputer 16 includes a central processing unit (CPU) and a memory storing a program for implementing process functions of each step. Accordingly, the program for implementing process functions of each step shown in FIG. 7 is read out from the memory and executed by the central processing unit (CPU) to implement each process function shown in FIG. 7. Apart from the method in which a CPU executes a program to implement each process step as in the present embodiment, all or part of the process functions of each process step can be implemented by dedicated hardware.

Also, the memory included in the above described microcomputer 16 may be composed of a magnetic optical disk apparatus, a nonvolatile memory such as flash memory, a read-only recording medium such as CD-ROM, a volatile memory other than RAM, or a computer readable and writable recording medium being a combination thereof.

Also, the above described program for the microcomputer 16 implementing various process functions may be recorded onto a computer readable recording medium. In this case, the program recorded on the recording medium is read to a computer system and executed to perform each process. The "computer system" as used herein includes OS and hardware such as peripheral devices.

Also, the program may be transmitted from the computer system having the program stored in the *storage apparatus or the like to another computer system via a transmission medium or by transmission wave in a transmission medium. The "transmission medium" transmitting the program as used herein refers to a medium having a function of transmitting information, including a network (communication network), such as the Internet, and a communication line (communication wire) such as telephone lines.

Also, the above described program may be one for implementing part of the above described functions, or one for implementing the above described functions by a combination with programs which have already been recorded on the computer system, i.e., a difference file (difference program).

Also, a program product having the above described program recorded thereon, such as a computer readable recording medium, can also be applied as an embodiment of the present invention.

The embodiments of the present invention have been described with reference to the drawings. However, any specific configuration is not limited to these embodiments, and designs etc. created without departing from the gist of the present invention are also included.

This application claims priority from Japanese Patent Application No. 2004-244242 filed on Aug. 24, 2004, which is hereby incorporated by reference herein.

What is claimed is:

1. An imaging apparatus comprising:
   imaging unit adapted to capture an object and obtain an image signal of interlace scan type;
   motion vector detection unit adapted to receive the image signal obtained by the imaging unit, detect a motion vector from the received image signal and output the detected motion vector;
   vibration correction unit adapted to receive the motion vector output from the motion vector detection unit and correct, according to the received motion vector, vibration of an image of the object so that the vibration-corrected image signal of the interlace scan type is obtained from the object captured by the imaging unit; and
   conversion unit adapted to receive the vibration-corrected image signal and convert the vibration-corrected image signal to an image signal of progressive scan type by use of the motion vector used by the vibration correction unit to obtain the vibration-corrected image signal of the interlace scan type.

2. An apparatus according to claim 1, wherein the vibration-corrected image signal is composed of a plurality of frames each including two fields, and wherein the conversion unit includes motion judgment unit adapted to judge interfield motion of the vibration-corrected image signal by use of the motion vector and a difference signal between two successive fields of the vibration-corrected image signal, and interpolation data generation unit adapted to generate interpolation data according to the judgment result of the motion judgment means, and convert the vibration-corrected image signal to the image signal of the progressive scan type by use of the interpolation data.

3. An apparatus according to claim 2, wherein the motion vector detection unit detects a motion vector between two successive fields of the vibration-corrected image signal.

4. An apparatus according to claim 2, wherein the conversion unit interpolates a pixel between lines within one field of the vibration-corrected image signal by use of the interpolation data to thereby generate the image signal of the progressive scan type.

5. An apparatus according to claim 4, wherein the interpolation data generation unit combines, according to the judgment result of the motion judgment unit, intrafield interpolation data generated by using only an image signal within the one field and interfield interpolation data generated by using an image signal of another field to thereby generate the interpolation data.

6. A signal processing apparatus comprising:
   input unit adapted to input an image signal of an object of interlace scan type;
   motion vector detection unit adapted to receive the image signal input by the input unit, detect a motion vector from the received image signal and output the detected motion vector;
   vibration correction unit adapted to receive the image signal input by the input unit and the motion vector output from the motion vector detection unit, correct, according to the received motion vector, vibration of an image of the object so that the vibration-corrected image signal of the interlace scan type is obtained; and
   conversion unit adapted to receive the vibration-corrected image signal obtained by the vibration correction unit and convert the vibration-corrected image signal to an image signal of progressive scan type by use of the motion vector used by the vibration correction unit to obtain the vibration-corrected image signal of the interlace scan type.

7. An apparatus according to claim 6, wherein the vibration-corrected image signal output from the vibration correction unit is composed of a plurality of frames each including two fields, and wherein the conversion unit includes motion judgment unit adapted to judge interfield motion of the vibration-corrected image signal output from the vibration correction unit by use of the motion vector and a difference signal between two successive fields of the vibration-corrected image signal output from the vibration correction unit, and interpolation data generation unit adapted to generate interpolation data according to the judgment result of the motion judgment unit, and convert the vibration-corrected image signal to the image signal of progressive scan type by use of the interpolation data.

8. An imaging method comprising:
   an imaging step of capturing an object and obtaining a first image signal of interlace scan type;
   a motion vector detection step of receiving the image signal obtained in the imaging step, detecting a motion vector from the received image signal and outputting the detected motion vector;
   a vibration correction step of receiving the motion vector output in the motion detection step and correcting, according to the motion vector, vibration of an image of the object so that the vibration-corrected image signal of the interlace scan type is obtained from the object captured in the imaging step; and a conversion step of receiving the motion vector output in the motion detection step and the vibration-corrected image signal obtained in the imaging step and converting the vibration-corrected image signal to an image signal of progressive scan type by use of the motion vector used in the vibration correction step to obtain the vibration-corrected image signal of the interlace scan type.

9. A method according to claim 8, wherein the vibration-corrected image signal is composed of a plurality of frames each including two fields, and wherein the conversion step includes a motion judgment step of judging interfield motion of the vibration-corrected image signal the motion vector and a difference signal between two successive fields of the vibration-corrected image signal, and an interpolation data generation step of generating interpolation data according to the judgment result of the motion judgment step, and converts the vibration-corrected image signal to the image signal of the progressive scan type by use of the interpolation data.

10. A method according to claim 9, wherein the motion vector detection step detects a motion vector between two successive fields of the vibration-corrected image signal.

11. A method according to claim 9, wherein the conversion step interpolates a pixel between lines within one field of the vibration-corrected image signal by use of the interpolation data to thereby generate the image signal of the progressive scan type.

12. A method according to claim 11, wherein the interpolation data generation step combines, according to the judgment result of the motion judgment step, intrafield interpolation data generated by using only an image signal within the one field and interfield interpolation data generated by using an image signal of another field to thereby generate the interpolation data.

13. A method according to claim 9, wherein the conversion step includes coefficient output step of outputting a coefficient corresponding to the correction method in the vibration correction step, and wherein the motion judgment step performs a predetermined calculation by use of the coefficient outputted in the coefficient output step, the motion vector, and the difference signal to thereby judge the motion.

14. A method according to claim 13, further comprising a selection step of selecting whether or not the vibration correction process by the vibration correction step is performed, wherein the coefficient output step varies the value of the coefficient according to the selection of the vibration correction process in the selection step.

15. A signal processing method comprising:
an input step of inputting an image signal of an object of interlace scan type;
a motion vector detection step of receiving the image signal input in the inputting step, detecting a motion vector of the received image signal and outputting the detected motion vector;
a vibration correction step of receiving the image signal input in the inputting step and the motion vector output in the motion detection step and correcting, according to the received motion vector, vibration of an image of the object so that the vibration-corrected image signal of the interlace scan type is obtained; and
a conversion step of receiving the motion vector output in the motion detection step and the vibration-corrected image signal obtained in the vibration correction step and converting the vibration-corrected image signal to an image signal of progressive scan type by use of the motion vector used in the vibration correction step to obtain the vibration-corrected image signal of the interlace scan type.

16. A method according to claim 15, wherein the vibration-corrected image signal obtained from the vibration correction unit is composed of a plurality of frames each including two fields, and wherein the conversion step includes a motion judgment step of judging interfield motion of the vibration-corrected image signal output in the vibration correction step by use of the motion vector and a difference signal between two successive fields of the vibration-corrected image signal output in the vibration correction step, and an interpolation data generation step of generating interpolation data according to the judgment result of the motion judgment step, and converts the vibration-corrected image signal to the image signal of the progressive type by use of the interpolation data.

17. An imaging apparatus comprising:
imaging unit adapted to capture an object and obtain an image signal of interlace scan type;
motion vector detection unit adapted to receive the image signal obtained by the imaging unit, detect a motion vector from the received image signal and output the detected motion vector;
vibration correction unit adapted to receive the motion vector output from the motion vector detection unit and correct, according to the received motion vector, vibration of an image of the object so that the vibration-corrected image signal of the interlace scan type is obtained from the object captured by the imaging unit;
motion judgment unit adapted to weight, with the motion vector used to obtain the vibration-corrected image signal, a difference information indicating a difference between two fields of one frame included in the vibration-corrected image signal obtained based on the detected motion vector, and generate a motion judgment signal indicating an amount of motion of the object based on the weighted difference information;
conversion unit adapted to convert the vibration-corrected image signal of the interlace scan type to an image signal of progressive scan type in accordance with the motion judgment signal generated by the motion judgment unit;
selection unit adapted to select whether the vibration correction process by the vibration correction unit is performed;
control unit adapted to change the weight of the motion vector for the motion judgment signal to be generated by the motion judgment unit, in accordance with a selection result of the selection unit.

* * * * *